Nov. 25, 1958                  J. A. BARING                  2,862,162
                        FORCE REBALANCING SERVOSYSTEM
Filed May 27, 1955                                    4 Sheets-Sheet 1

INVENTOR.
JOHN A. BARING
BY Henry L. Hanson
ATTORNEY.

Nov. 25, 1958 J. A. BARING 2,862,162
FORCE REBALANCING SERVOSYSTEM
Filed May 27, 1955 4 Sheets-Sheet 2

INVENTOR.
JOHN A. BARING
BY Arthur H. Swanson
ATTORNEY.

Nov. 25, 1958 J. A. BARING 2,862,162
FORCE REBALANCING SERVOSYSTEM
Filed May 27, 1955 4 Sheets-Sheet 3

INVENTOR.
JOHN A. BARING
BY
ATTORNEY.

Nov. 25, 1958  J. A. BARING  2,862,162
FORCE REBALANCING SERVOSYSTEM
Filed May 27, 1955  4 Sheets-Sheet 4

INVENTOR.
JOHN A. BARING
BY
*Henry L. Hanson*
ATTORNEY.

United States Patent Office 2,862,162
Patented Nov. 25, 1958

2,862,162

FORCE REBALANCING SERVOSYSTEM

John A. Baring, Hatboro, Pa., assignor to Minneapolis-Honeywell Regulator Company, Minneapolis, Minn., a corporation of Delaware Application May 27, 1955, Serial No. 511,477

23 Claims. (Cl. 318—21)

A general object of the present invention is to provide a new and improved signal converting apparatus useful particularly in the field of automatic instrumentation and control. More specifically, the present invention is concerned with the provision of a universal type of signal controller mechanism which is characterized by its adaptability for use with fluid pressure control signals, mechanical control signals, electrical control signals, or combinations thereof. The present invention has particular utility in automatic process controllers in which one or more control parameters may be added to produce a desired controlling action.

A basic type of process controller is one which receives an input signal and produces an output controlling action which regulates the magnitude of a process variable in a desired manner. The controlling action required to regulate any particular process variable is dependent upon the type of process. The final process variable control action generally is an action which is proportional to the magnitude of an input signal representative of the process variable. The proportional action may be modified in accordance with the rate at which the process variable changes and in accordance with the extent and time that the process variable deviates from its desired set point value. The control action modifying factors of the controller are conventionally referred to as proportional, rate, and reset action. The present invention is particularly adapted for use in controllers incorporating proportional, rate, or reset action, or any desired combination of these parameters.

As the input signal to a controller may be derived in numerous ways, such as by an electrical signal, a fluid pressure signal, or by a mechanical motion, it is desirable to provide a controller configuration which is readily adapted for any type of input and which will produce a desired type of output while being adapted to include the parameters of proportional, rate, and reset action.

It is accordingly a more specific object of the present invention to provide a process controller which is adapted to have as an input either an electrical signal, fluid pressure signal, or a mechanical signal and produce on its output either a fluid pressure effect or an electrical effect.

The basic element in the controller of the present invention is a permanent magnet which is adapted for movement in accordance with a preselected input or output control signal. The permanent magnet is operative to create a force on a movable member in accordance with the signal applied thereto. The reaction forces of the permanent magnet on the movable member may be varied as a function of time to provide a desired rate and reset action in a complete controller configuration.

It is therefore a further object of the present invention to provide an improved means for applying a variable force to a movable member in which the means comprises a permanent magnet which is adapted to be moved relative to the movable member to apply variable forces thereto.

Another more specific object of the present invention is to provide an improved force producing apparatus employing a permanent magnetic member whose motion is regulated as a function of time so as to produce upon a pivoted member forces which vary as a function of time.

The various features of novelty which characterize the invention are pointed out with particularity in the claims annexed hereto and forming a part of this specification. For a better understanding of the invention, its advantages, and specific objects obtained with its use, reference should be had to the accompanying drawings and descriptive matter in which there is illustrated and described preferred embodiments of the invention.

Figure 1

Figure 1:
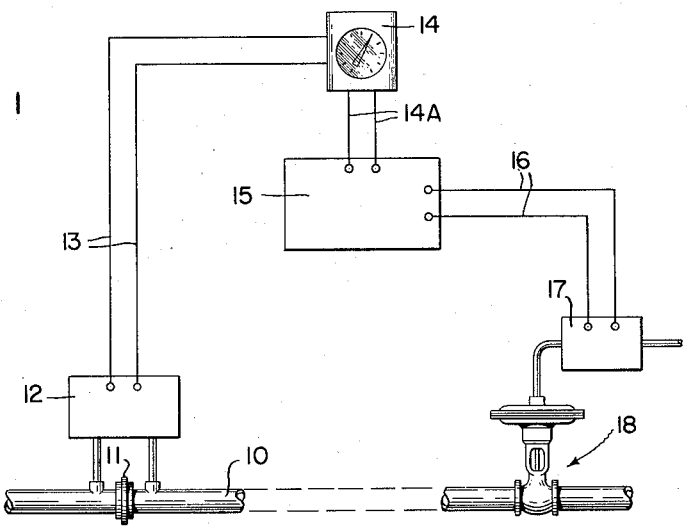
Figure 1 is a schematic showing of a basic process which is to be controlled, such as by the controllers incorporating the present invention.

Referring first to Figure 1, the numeral 10 represents a conduit through which a fluid is flowing, the rate of flow of which is to be regulated by a suitable controller such as one of the controllers disclosed in the present application. An orifice plate 11 is connected in the pipe 10 to establish a differential pressure drop across the orifice in accordance with the rate of flow of the fluid through the pipe. A differential pressure transmitter 12 is connected to respond to the pressure drop across the orifice 11 and to produce an electrical output signal on leads 13 which is proportional to the rate of flow of the fluid through the conduit 10. This differential pressure transmitter may well take the form of the transmitter disclosed in the copending application of William F. Newbold, Serial No. 391,207, filed November 10, 1953. The output electrical signal from the transmitter 12 may be applied to a suitable indicator 14 which may also be of the type disclosed in the copending Newbold application. The output of the transmitter 12 is also connected by way of the leads 13 and the indicator 14 to the controller 15, the latter of which may take the form of one of the controllers disclosed below. The indicator 14, if of the type disclosed in the above-mentioned Newbold application, will have a set point source therein so that the output signal from the indicator applied to the controller 15 will be proportional to the deviation between the set point signal and the measured process variable as represented by the signal on the leads 13.

The output from the controller 15 is shown here as an electrical signal which is applied to a current to pressure transducer 17. The output of the current to pressure transducer 17 will be a proportional pneumatic pressure which is applied to regulate the positioning of a pneumatic valve 18. The valve 18, in turn, is used to regulate the flow of the fluid in the conduit 10 so that the flow will be of the desired magnitude. If there is a deviation of the flow from the desired value, there will be appropriate signals applied through the controller 15 to the valve 18 to correct for these deviations to change the magnitude of the flow back to the desired value.

Figure 2:
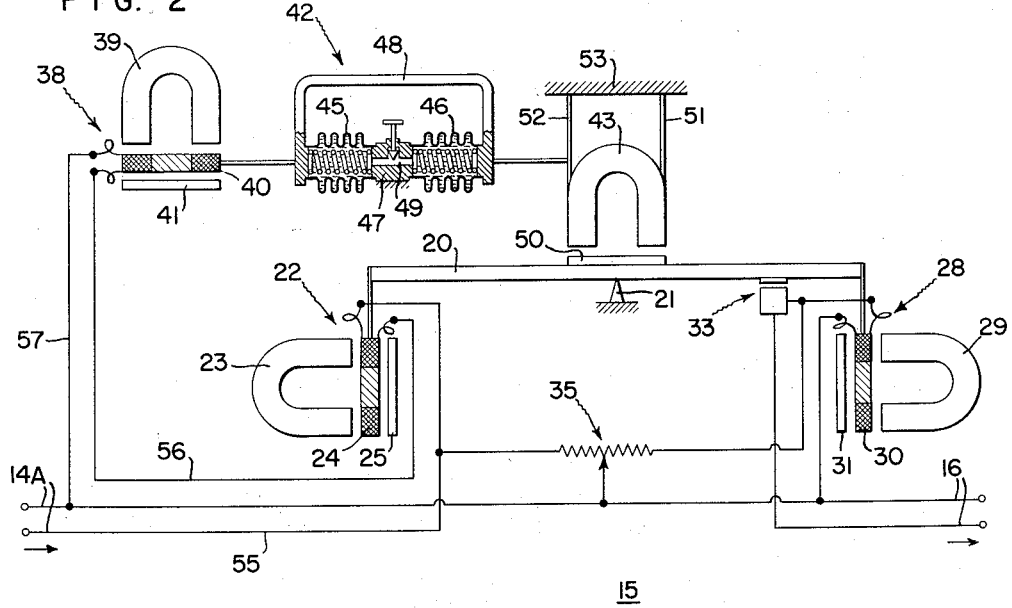
Figure 2 is a schematic drawing showing of an electrical controller having proportional and reset controlling actions.

*Figure 2*

Figure 2 shows one form that the controller 15 useful in the process control configuration shown in Figure 1 may take. The controller comprises a movable member 20 in the form of a pivoted beam. As shown, the member or beam 20 is pivoted on a knife edge pivot 21. The input to the beam 20 is a force which is produced by an electromagnetic force producing unit 22. This input force producing unit comprises a permanent magnet 23 having a pair of planar pole faces with a planar coil 24 positioned in cooperative relation with respect thereto. A field concentrating member 25 may be positioned on the opposite side of the coil 24 from the permanent magnet 23. This type of force producing unit is of the general type disclosed in the copending application of Philip E. Shafer, Serial No. 433,505 and filed June 1, 1954.

For producing a balancing force upon the beam 20 there is provided a further force balancing unit 28 which is of the same general type as the device 22. This force producing unit comprises a permanent magnet 29, a planar coil 30, and a field concentrating member 31. The electromagnetic force producing unit 28 is connected to the beam 20 in such a manner that a balancing force may be created on the beam.

Figure 2A:
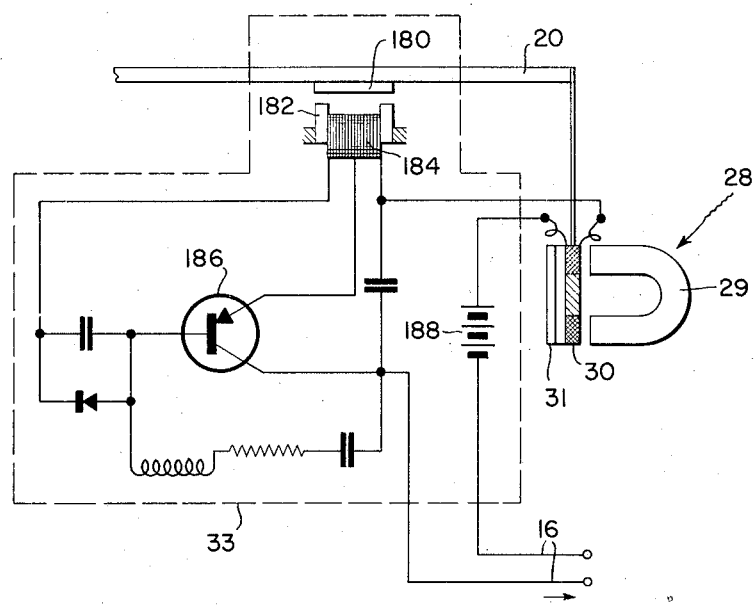
Figure 2A is a schematic showing of a portion of the arrangement shown in Figure 2.

The signal for the feedback coil 30 is produced by a beam position detector 33. This position detector is effective to produce an output control current proportional to the position of the beam 20. The position detector may well take the form of the position detector disclosed in the copending application of William J. Popowsky, Serial No. 442,264, filed July 9, 1954. One suitable arrangement which the detector may take is illustrated schematically in Figure 2A. In Figure 2A, a portion of the beam 20 is illustrated and carries, on one end thereof, the coil 30 of the force balancing unit 28. The detector unit is illustrated as being enclosed in the dotted line box 33. This unit includes a magnetic member 180 positioned on the beam 20. Supported adjacent to the magnetic member 180 is a core member 182 which carries a coil 184. This coil 184 is coupled in the oscillatory output of the oscillator circuit which includes a semiconductive device 186. The oscillator is energized from a D. C. power source represented by the battery 188. It may be seen that a change in the position of the beam 20 causes the magnetic member 180 to approach or recede from the core member 182. This change in position causes the air gaps between the ends of the core member and the magnetic member to be changed. The change in the air gaps produces a corresponding change in the impedance presented to the oscillatory current flowing in the coil 184 which is included in the oscillator circuit. This in turn produces a change in the loading on the oscillator. With changes in load, there is a change in the current supplied to the oscillator from the direct current source 188. It may therefore be seen that changes in position of the beam 20 result in a change in the direct current flowing through the coil 30 and, hence, along the lines 16 which constitute the output circuit of the controller. The position detector shown in Fig. 2A of this case corresponds substantially identically in all essential details to the position detector shown in Fig. 1 of the Popowsky application. Although the position detector is shown in a typical environment in Fig. 1 of the Popowsky case, so much of the system as extends to the right of the beam pivot in that drawing is the same as the structure shown in Fig. 2A of this instant application.

The proportional relationship between the input signal applied to the input terminals 14A and the signal on the output terminals 16 may be regulated by a potentiometer 35. This potentiometer may be referred to as a proportional band adjusting potentiometer.

For producing a force upon the beam 20 which varies as a function of time, there is provided a further electromagnetic force producing unit 38 which includes a permanent magnet 39, a planar coil 40, and a field concentrating member 41. The electromagnetic force producing member 38 acts through a fluid motion damping means 42 to produce a positional change of the permanent magnet 43. The fluid motion damping means 42 is shown here as comprising a pair of bellows 45 and 46 which are connected in end to end relationship by means of a support member 47. The bellows units 45 and 46 at their opposite ends are connected by a rigid U-shaped member 48 so that the opposite ends of the bellows units 45 and 46 are arranged to move together. A restricted passageway 49 is connected between the chambers 45 and 46 to provide an adjustable restriction for the fluid flowing between the bellows units 45 and 46.

The permanent magnet 43 which is adapted to be moved by the electromagnetic force producing unit 38 has a pair of planar pole faces positioned adjacent a flux concentrating member 50 which is carried by the beam 20. The permanent magnet 43 is supported by a pair of highly flexible supporting elements 51 and 52, the latter of which are fastened to a supporting block 53. These supporting elements limit the movement of magnet 43 to a plane which is approximately parallel to the surface of the member 50.

In considering the operation of Figure 2, it should first be understood that the only time that there will be an input signal applied to the input terminals 14A will be when there is an error signal indicating the need for a change in the output current on the output leads 16. It will be recalled that the indicator 14 is provided with a set-point signal source, a signal which is representative of the desired value of the process variable. The process-derived signal is compared with this signal and the only signal passed on to the controller will be a difference or error signal. If the process variable is at the desired value, the two signals exactly balance and no signal is passed on to the controller. When there is an error signal on the leads 14A, there will be a current flowing through lead 55, coil 24, lead 56, coil 40, and lead 57 to the other input terminal 14A. During the first instant that this error signal appears, the coil 24 will react in the field of the permanent magnet 23 to create a force on the left end of the beam 20. There will be a tendency for the beam to move about its pivot 21 and thereby cause the position detector 33 to produce an output current which will be proportional to the new position. The output current from the position detector 33 is fed through the coil 30 to the output leads 16. The current flowing through the coil 30 will be effective to create a balancing force upon the beam 20 which will tend to move the beam back to its initial position. The magnitude of the current flow in the lead 16 with respect to the input signal on leads 14A will be dependent upon the setting of the potentiometer 35 which acts as a current divider with respect to the current flowing from the input terminals 14A and the current applied to the coil 30.

While any error signal applied to the coil 24 is also applied to the coil 40, the effect of the signal applied to the coil 40 will not be felt immediately upon the beam 20 due to the action of the fluid motion damping means 42. The coil 40 will apply a force to the left end of the bellows unit 45 and to the U-shaped member which is coupled to the right end of the bellows 46. Since the bellows units are fluid filled, they remain substantially rigid unless the fluid from one bellows can be bled into the other. The bleeding of the fluid from the bellows 45 to the bellows 46 is through the restricted passageway 49. As the fluid bleeds from one bellows unit to the other, it is possible to displace the U-shaped member 48 and thereby the permanent magnet 43. As the magnet 43 moves its force vector relative to the pivot 21, there will be produced on the beam 20 a torque proportional to that displacement. Since the rate of movement of the permanent magnet 43 will be dependent upon the time that the force is applied by the coil 40 and the magnitude of the force, there is thus a resultant torque which is an integral function of the applied signal to the coil 40. This integral function is added to the forces acting on the beam 20 from the electromagnetic force producing unit 22. To balance these applied forces which are proportional to the magnitude and the integral time function of the input error signal, it is necessary that the current flowing through the balancing coil 30 be a function of the input signal and the time integral of the input signal. The combined action of the force producing unit 22 and the force producing unit 38 is thus apparent in the output in the form of a current which includes a proportional plus an integral function. Once the magnet 43 has been displaced due to the action of the force producing unit 38, it will tend to remain in that position.

The effect of the controller of Figure 2 in the process control configuration shown in Figure 1 is to maintain the fluid flow at the desired set point value. If the flow should suddenly change, there will be a readjustment of the valve 18 which will be proportional to that change. The readjustment of the valve will normally bring the flow back to the desired value so that no further correction is required. If there is a sustained deviation, the reset portion of the controller will be effective to slowly change the position of the output valve 18 so that the set point value will eventually be reached.

Figure 3:
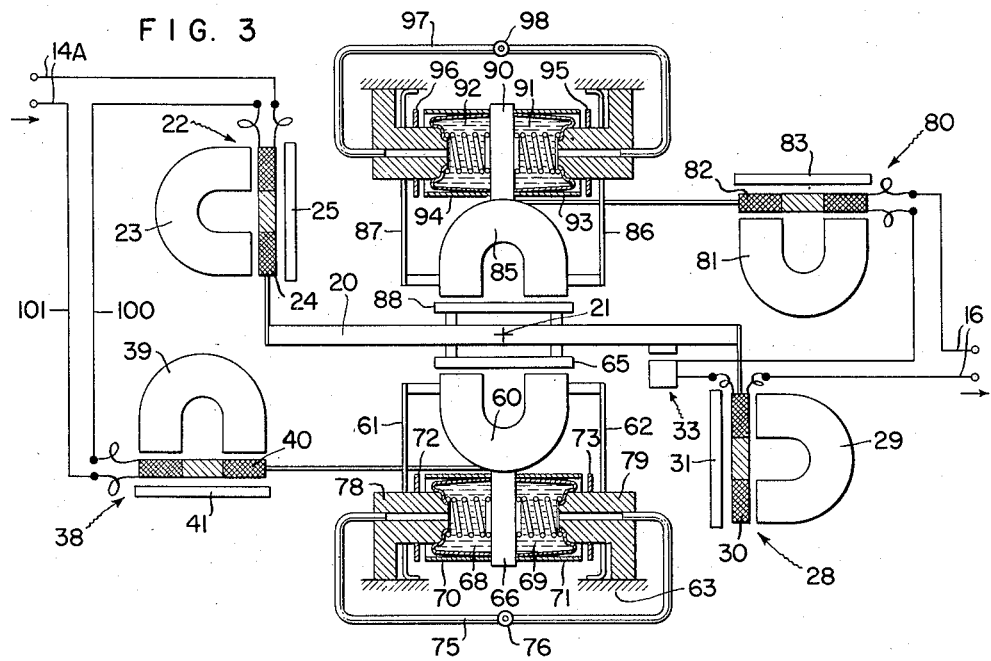
Figure 3 is a further form of controller incorporating the principles of the present invention and having proportional, rate, and reset action.

*Figure 3*

Referring now to Figure 3, there is here shown a modification of the apparatus of Figure 2 with the controller incorporating proportional action, rate action, and reset action. Corresponding components between Figures 2 and 3 carry corresponding reference characters. The two primary changes in the present figure over that of Figure 2 are the addition of a rate unit and a modification in the manner in which the fluid motion damping means is arranged with respect to the rate and reset units to produce forces upon the beam 20 which are a time function of an applied signal.

The reset unit in the present figure comprises a permanent magnet 60 which is supported by a pair of leaf springs 61 and 62 upon a suitable anchor block 63. The magnet 60 is arranged for substantially planar movement with respect to a flux concentrating planar member 65, the latter of which is rigidly attached to the beam 20 at a position which is symmetrical with respect to the pivot 21. Projecting from the magnet 60 is a member 66 to which the fluid damping means is connected.

The fluid damping means in the present arrangement comprises a pair of chambers 68 and 69. These chambers are enclosed by a suitable resilient member such as an extended stroke diaphragm of conventional type. Protecting the diaphragms in the chambers 68 and 69 is a protective cylindrical sleeve 70 and 71. The sleeves 70 and 71 are mounted as an integral part of the member 66 and cooperate with mechanical stops 72 and 73 to limit the movement of the permanent magnet 60. The chambers 68 and 69 are connected by a fluid passageway 75 which has an adjustable restriction 76 in series therewith. The passageway 75 extends through the central portion of two diaphragm supporting elements 78 and 79.

The rate unit in the present figure comprises means for integrating the output signal and applying that output signal as a feedback to the beam 20. The output signal is detected by an electromagnetic force producing unit 80 which comprises a permanent magnet 81, a coil 82, and a field concentrating member 83. The coil 82 is directly connected to the permanent magnet 85. The permanent magnet 85 is supported by a pair of highly flexible support members 86 and 87, the latter of which limit the motion of the magnet 85 to a plane substantially parallel to the planar member 88. The planar member 88 is mounted upon the beam 20 and is symmetrically positioned with respect to the pivot 21. Extending from the top of the permanent magnet 85 is a projecting member 92 which is attached to a further pair of diaphragm enclosed chambers 91 and 92. The diaphragms of the chambers 91 and 92 are protected by a protective cylinder 93 and 94 which are adapted to cooperate with mechanical stops 95 and 96. The chambers 91 and 92 are interconnected by a fluid passageway 97 having a restriction 98 in series therewith.

The basic functioning of the rate and reset units in the present figure are the same. For this reason, only the basic functioning of the reset unit will be explained in detail. With a signal applied to the coil 40, there will be a resultant force tending to move the permanent magnet 60 with respect to the member 65 so that its torque vector moves relative to the pivot 21. The motion of the permanent magnet 60 will be restrained by the fluid within the chambers 68 and 69 so that initially there will be no movement of the permanent magnet 60 upon the application of the signal to the coil 40. Fluid in the chambers 68 and 69 will tend to flow from one chamber to the other depending upon the direction of the force tending to move the permanent magnet 60. As the fluid does flow through the passageway 75 and restriction 76 it will be possible for the permanent magnet 60 to move and thereby create on the beam 20 through the member 65 a force tending to rotate the beam about its pivot 21.

In considering the overall operation of the controller shown in Figure 3, it is first assumed that there is applied a step input signal to the input terminals 14A. This input signal will be applied directly to the coil 24 and the coil 40 which are connected in a series circuit. This circuit may be traced from the input terminal 14A through coil 24, lead 100, coil 40, and lead 101 to the other input terminal. The current flowing through the coil 24 will apply an immediate force upon the beam 20 tending to rotate the beam about its pivot point 21. This motion produces a change in position which will be detected by the position detector 33 which will produce a change in output current proportional to the change in position. The output current is fed through the feedback coil 30 and to the rate unit coil 82, the latter being connected in series with the output of the position detector 33. The initial effect of the step input will thus be to produce on the output terminals a corresponding step change in the output signal. If the input error signal continues over a period of time, the reset permanent magnet 60 will be slowly displaced with respect to the member 65 in a direction to add to the applied torque created by the electromagnetic unit 22 and coil 24. As this movement of the permanent magnet 60 will be in accordance with the amplitude of the applied signal and in accordance with time, there will be a force on the beam 20 which is an integral of the input signal and which will cause a corresponding change in the output current on the output leads 16.

The rate unit which includes parts 80—98 has the effect of providing an integrated feedback signal to the beam 20 which is in a direction to minimize the amount of feedback force required in the feedback coil 30. The net effect of the rate unit on the output current on lead 16 is to permit the output current to rise sharply with a step input signal and then to cut back the output current as a function of time as the magnet 85 is moved in a beam balancing direction by the action of the current flowing through the coil 82.

As pointed out above, the rate unit is in effect an integrator but since the integrator is connected in a feedback loop, it has the effect of creating a rate action on the output. More specifically, when there is a change in the current flow on the output of the position detector 33, this current flow will be supplied not only to the direct feedback coil 30 but also to the rate coil 82. The rate coil 82 tends to move the magnet 85 in a direction which will cause the magnet to create a torque on the beam 20 which is in the same direction as the torque created by the direct feedback coil 30. However, due to the fluid motion damping means, including the chambers 91—92, the passageway 97, and restriction 98, the motion of the magnet 85 is delayed in accordance with a preselected function of time. The time function is variable in accordance with the setting of the restriction 98. Generally, the rate at which the magnet 85 will move will be relatively fast compared to the rate of movement of the magnet 60 in the reset portion of the apparatus. Thus, a step change on the input terminals 14A, which is sustained over a period of time, will result in the output current on the terminals 16 rising sharply and then dropping back toward its initial value and then slowly rising again as the reset portion of the controller becomes effective.

Figure 4

Figure 4:
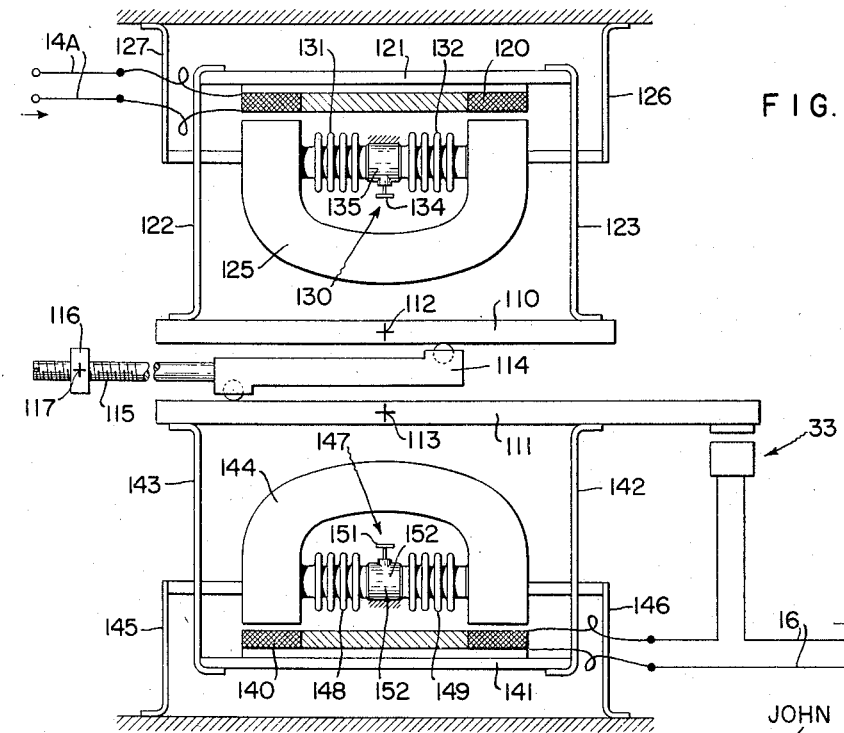
Figure 4 is a modification of the apparatus of Figure 3 and again incorporating proportional, rate, and reset action.

The apparatus disclosed in Figure 4 incorporates some of the basic operating structure disclosed in Figures 2 and 3 but has been modified so that the rate action of the controller is positioned ahead of the reset action in the order of its operation on the final control signal, thus making the controller more useful under process start-up conditions.

In Figure 4, the controller is built up from a pair of parallel beams 110 and 111 which are pivoted at 112 and 113 respectively. An adjustable motion transfer means 114 is positioned between the beams 110 and 111 to provide an adjustable lever arm ratio for varying the forces acting between the two beams. The adjustable means is arranged to be adjusted by a screw threaded shaft 115 which passes through a threaded support 116 which is pivoted at 117. The adjustment of the shaft 115 provides a proportional band adjustment for the controller as will be understood from the discussion that follows.

The input forces to the pivoted beam 110 are produced by the electrical current flowing in from the input terminals 14A. Connected to the input terminals is a coil 120 which is rigidly supported upon a beam 121. The beam 121 is rigidly attached to the pivoted beam 110 by rigid supporting means 122 and 123.

Also associated with the input coil 120 is a permanent magnet 125 which is supported by a pair of highly flexible supports 126 and 127, the latter of which limit the movement of magnet 125 to a plane substantially parallel to a coil 120. The motion of the permanent magnet 125 is restrained by fluid motion damping means 130 in the form of a pair of end to end bellows enclosed chambers 131 and 132, said chambers being joined by a fluid passageway having the restriction 134 in series therewith. The junction between the chambers 131 and 132 is accomplished by way of a rigid supporting member 135.

The output of the controller is determined by the position of the beam 111 as detected by the position sensing means 33. The position sensing means produces a change in output current proportional to the change in position of the beam 111 and thus is applied to a beam balancing means and a controller reset means. The balancing and reset means comprises a feedback coil 140 which is mounted on a beam 141, the latter of which is carried by a pair of rigid supporting members 142 and 143 which are attached to the pivoted beam 111. Co-operating with the coil 140 is a permanent magnet 144 which is carried by a pair of highly flexible members 145 and 146 which limit the motion of the magnet 144 to a plane which is substantially parallel to the coil 140. A fluid motion damping means 147 is attached to the permanent magnet 144 and this damping means comprises a pair of end to end bellows enclosed chambers 148 and 149. The chambers are joined by a fluid passage having a restriction 151 therein. The chambers 148 and 149 are enclosed at their common end by a rigid stationary wall 152.

Before considering the complete operation of Figure 4 as a controller, the manner in which the permanent magnet cooperates with the associated coil is considered first. When an electrical signal is applied to the coil 120, the field created by the current flowing through the coil 120 will react with the magnetic field of the permanent magnet 125. The immediate effect will be for the coil 120 to react in the field of the permanent magnet 125 so that a force will be applied to the beam 110. The permanent magnet will initially be held in a substantially fixed position due to the dampening action of the fluid motion damper 130. After the first instant, the fluid from one chamber of the motion damping means will tend to flow into the other through the restriction 134 with the rate of flow being dependent upon the opening of the restriction 134. As the magnet 125 begins to move, it will move in a direction which will tend to eliminate the reaction force between the coil 120 and the magnetic field of the permanent magnet 125 to reduce the force on beam 110.

In considering the operation of the input signal on the input beam 110, it is first assumed that a step input signal is supplied to the input terminals 14A. This step input will be applied directly to the coil 120 which in turn will react directly with the peramnent magnet field of the magnet 125 to create a reaction force between the permanent magnet 125 and the coil 120 which will cause the coil 120 to exert a rotational force upon the beam 110. The reaction force on the beam 110 will also be applied to the magnet 125 and while this magnet will initially remain stationary, it will slowly move in a di-direction to shift its force vector relative to the pivot 112 to decrease the total force on the beam 110. The reaction is thus responsive to the rate of change of the applied input signal.

The forces created upon the beam 110 tending to rotate the beam are transferred to the force coupler 114 to the beam 111 so that there is a tendency for the beam 111 to be moved. The position of the beam is detected by the position detector 33 and the output current from the detector will be proportional to the applied forces. This output current is applied directly to the feedback coil 140. The current flowing through the coil 140 reacts with the permanent magnet 144 to create a force upon the beam 141. The beam 141 will tend to move and through its supports 142 and 143 will transmit a feedback motion to the beam 111 tending to balance the applied forces originating in the beam 110. The permanent magnet 144, while the reaction force is applied thereto, will be limited in its rate of motion, in a direction to shift its vector force on beam 111, by the fluid damping means 147. After a period of time, depending upon the setting of the reset restriction 151, the permanent magnet 144 will have moved to a position where the reaction force between the coil 140 and the magnet 144 has been substantially cancelled out by the shift in the vector force about pivot 113. If there is a sustained input signal applied to the input terminals 14A, the effect of the movement of the magnet 144 will be to eliminate slowly the feedback action of the coil 140 upon the beam 111. Thus, to maintain a balance in this system, it is essential that more current be supplied to the coil 140. Thus, the output current, with a sustained input signal, will slowly increase in accordance with the reset action of the controller.

The proportional action of the controller may be varied by adjusting the force transmitting member 114 in its position with respect to the beams 110 and 111. The forces required from the output beam 111 to balance the input beam 110 will be dependent upon the effective lever arms formed by the beam 110 and beam 111 with respect to the bearing points of the force transmitting means 114 and the respective pivots 112 and 113.

As pointed out above, the rate action of this particular controller is in the input ahead of both the proportional band adjustment and the reset adjustment. By putting the rate action ahead of the reset under start-up conditions, it is possible to achieve a more stable start-up of a process. The effect of the rate unit ahead of the reset is to make the controller see an apparent input variable magnitude representative of a set point value prior to the time the true variable reaches the set point value. This will cause the controller to cut back its controlling action and level off at the desired set point value without any appreciable overshoot of the variable above the set point value.

Figure 5:
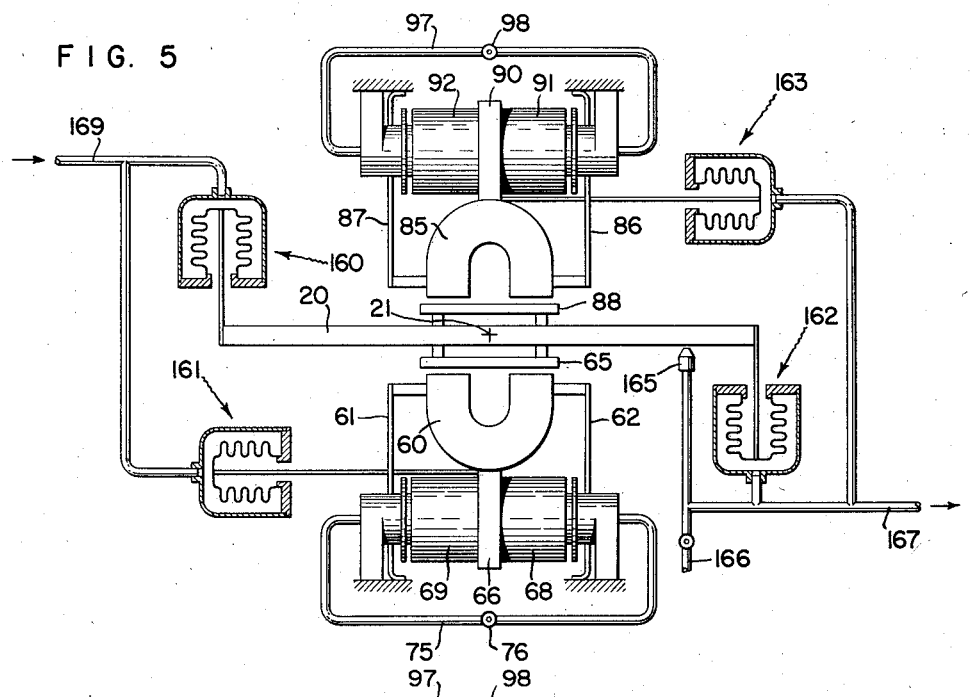
Figure 5 shows the present invention modified for use with a fluid pressure input and output.

*Figure 5*

The apparatus shown in Figure 5 is substantially the same as that of Figure 3 except that it has been modified for a fluid pressure signal input and a fluid pressure output. The rate and reset units correspond to the rate and reset units of Figure 3 and carry corresponding reference characters. The same is true of the principal pivoted beam of the apparatus.

Added to Figure 5 in place of the electromagnetic force producing units of Figure 3 are a plurality of fluid force producing units 160, 161, 162, and 163. Each of these units comprises a bellows unit which is adapted to have a fluid pressure applied thereto with a mechanical connection output for applying a force to a portion of the controller. For detecting the motion of the beam 20, there is provided a nozzle 165 which has an opening adjacent the beam 20 so that the beam may act as a means for throttling the air flowing therefrom. Air is supplied to the nozzle 165 by way of a restricted inlet 166 and the output from the nozzle is passed through an output conduit 167. The input to the controller is by way of a supply conduit 169 which is adapted to have applied thereto a control pressure which varies as a function of some predetermined variable.

The basic operation of Figure 5 corresponds to that of Figure 3 except that an applied pressure signal from the inlet conduit 169 creates a force through the pressure to force transducer 160. The displacement of the beam 20 is detected by a change in the back pressure in the nozzle 165 and thereby a change in the pressure applied to the pressure to force transducer 162. This will effect a balancing force upon the beam 20.

The integral or reset action of the controller is achieved by the pressure to force transducer 161 acting upon the permanent magnet 60. The rate action of the present controller is achieved by the feedback of a fluid pressure signal from the output conduit 167 to the pressure to force transducer 163 which in turn creates a force upon the permanent magnet 85. The forces applied in this manner act in the same manner as the electromagnetically produced forces to produce an output control signal.

Figure 6:
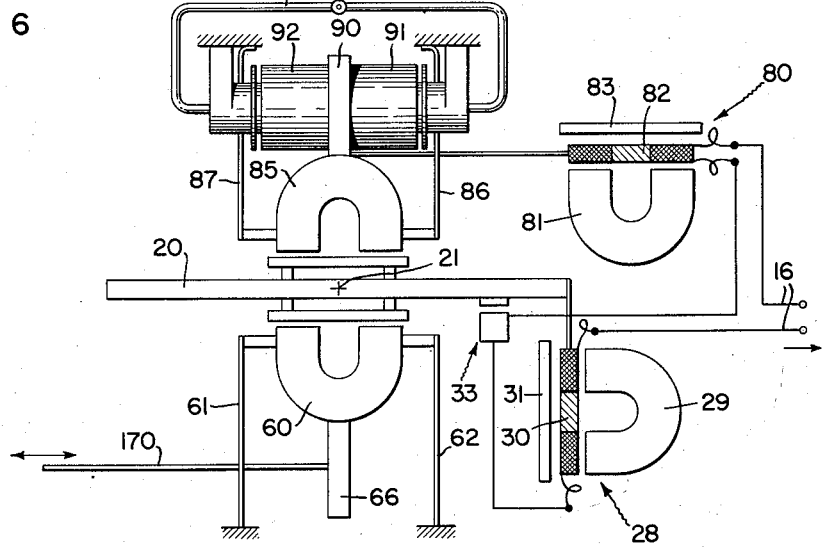
Figure 6 shows the apparatus modified for a mechanical input.

*Figure 6*

The apparatus of Figure 6 is basically a modification of Figure 3 and corresponding components carry corresponding reference characters. The principal modification in the Figure 6 over Figure 3 lies in the elimination of the damping unit on the permanent magnet 60 and provides in lieu thereof a mechanical motion input as by a link 170 which is connected directly to the extension of the magnet 66. This constitutes the only input force producing means for the beam 20 in this particular configuration.

Concerning the operation of the apparatus shown in Figure 6, input motion applied to the magnet 60 will displace the magnet 60 with respect to the member 65 carried by the beam 20. This will create an unbalance force upon the beam 20 tending to rotate the beam. The position of the beam will be detected by the position detector 33 which in turn will create, by way of the force balancing coil 30, a balance of the forces acting upon the beam 20. In addition, the output current from the position detector 33 will be applied to the electromagnetic force producing unit 80 which, by way of coil 82, will apply a force to the magnet 85. This feedback action will introduce a rate action into the output current flowing through the output leads 16.

While certain control configurations have been shown and discussed in the specification and drawings supra, it will be readily apparent that fluid pressure signals, mechanical motion signals and electrical signals may be intermixed in any desired manner so as to produce the desired controlling action. Thus, the controller configuration lends itself to universal application.

While, in accordance with the provisions of the statutes, there has been illustrated and described the best forms of the invention known, it will be apparent to those skilled in the art that changes may be made in the forms of the apparatus disclosed without departing from the spirit of the invention as set forth in the appended claims and that in certain cases, certain features of the invention may be used to advantage without a corresponding use of other features.

Having described the invention, what is claimed as new and for which it is desired to secure Letters Patent is:

1. An electro-magnetic torque producing means comprising a permanent magnet having a pair of planar pole faces and mounted for substantially planar movement, a planar magnetic field responsive member positioned adjacent said permanent magnet to be acted upon by the magnetic field of the planar pole faces of said permanent magnet, a pivoted member carrying said planar member, and means for inducing a motion of said permanent magnet relative to said planar member so that a torque proportional to said movement will be applied to said pivoted member.

2. An electro-magnetic torque producing means comprising a permanent magnet having a pair of planar pole faces and mounted for substantially planar movement, a planar magnetic field responsive member positioned adjacent said permanent magnet to be acted upon by the magnetic field of the planar pole faces of said permanent magnet, a pivoted member carrying said planar member, said pivoted member being pivotally mounted at a point which is symmetrical with respect to said planar member.

3. An electro-magnetic torque producing means comprising a permanent magnet having a pair of planar pole faces and mounted for substantially planar movement, a planar magnetic field responsive member positioned adjacent said permanent magnet to be acted upon by the magnetic field of the planar pole faces of said permanent magnet, a pivoted member carrying said planar member, said pivoted member being pivotally mounted at a point which is symmetrical with respect to said planar member, and means for inducing a motion of said permanent magnet relative to said planar member so that a torque proportional to said movement will be applied to said pivoted member, said last named means comprising an electromagnetic coil having a pair of input terminals arranged for connection to a source of variable electrical signal.

4. An electro-magnetic torque producing means comprising a permanent magnet having a pair of planar pole faces and mounted for substantially planar movement, a planar magnetic field responsive member positioned adjacent said permanent magnet to be acted upon by the magnetic field of the planar pole faces of said permanent magnet, a pivoted member carrying said planar member, said pivoted member being pivotally mounted at a point which is symmetrical with respect to said planar member, and means for inducing a motion of said permanent magnet relative to said planar member so that a torque proportional to said movement will be applied to said pivoted member, said last named means comprising a fluid pressure responsive means having a mechanical output connection to said permanent magnet.

5. An electro-magnetic torque producing means comprising a permanent magnet having a pair of planar pole faces and mounted for substantially planar movement, a planar magnetic field responsive member positioned adjacent said permanent magnet to be acted upon by the magnetic field of the planar pole faces of said permanent magnet, a pivoted member carrying said planar member, said pivoted member being pivotally mounted at a point which is symmetrical with respect to said planar member, and means for inducing a motion of said permanent magnet relative to said planar member so that a torque proportional to said movement will be applied to said pivoted member, said last named means comprising a mechanical input connection whose motion is proportional to a preselected input variable.

6. An electro-mechanical apparatus comprising a permanent magnetic member mounted for movement in a substantially fixed plane, a pivoted member positioned adjacent said permanent magnetic member positioned in the magnetic field thereof, means connected to said permanent magnetic member to induce motion thereof to create a rotational force on said pivoted member, and a motion damping means connected to said permanent magnetic member to delay the application of the rotational force on said pivoted member.

7. Apparatus as defined in claim 6 wherein said damping means comprises a pair of resilient walled fluid filled chambers having a restricted fluid pasage connected between said chambers.

8. Apparatus as defined in claim 7 wherein said chambers are positioned in end to end relation and the opposite end walls of said chambers are connected to said permanent magnetic member.

9. Apparatus as defined in claim 7 wherein said chambers are positioned in end to end relation and the adjacent end walls of said chambers are connected to said permanent magnetic member.

10. Electro-mechanical apparatus comprising a permanent magnet mounted for substantially planar movement and having a pair of planar pole faces, a pivoted member, and a planar electrical coil mounted on said pivoted member and positioned in the field of said pole faces, said coil when energized creating a reaction force between said coil and said permanent magnet tending to rotate said pivoted member.

11. Electro-mechanical apparatus comprising a permanent magnet mounted for substantially planar movement and having a pair of planar pole faces, a pivoted member, and a planar electrical coil mounted on said pivoted member and positioned in the field of said pole faces, said coil when energized creating a reaction force between said coil and said permanent magnet tending to rotate said pivoted member, and a motion damping means connected to said permanent magnet, said damping means effecting a time variation of the reaction force on said pivoted member.

12. Apparatus for effecting a modification of a control signal comprising a pivoted member, input means positioned relative to said member to exert a first rotational force on said member, said input means being variable in accordance with the magnitude of an input signal, motion detecting means producing an output signal proportional to the motion of said pivoted member, a pivoted member balancing means connected to said motion detecting means and to said pivoted member to exert a balancing force on said member, and means connected to respond to one of said signals to exert on said pivoted member a rotational force which varies with time, said last named means comprising a permanent magnet having a pair of planar pole faces, a planar magnetic field responsive means positioned in the field of said pole faces and carried by said pivoted member, and signal responsive means connected to create a reactive force between said permanent magnet and said magnetic field responsive means.

13. Apparatus for effecting a modification of a control signal comprising a pivoted member, input means positioned relative to said member to exert a first rotational force on said member, said input means being variable in accordance with the magnitude of an input signal, motion detecting means producing an output signal proportional to the motion of said pivoted member, a pivoted member balancing means connected to said motion detecting means and to said pivoted member to exert a balancing force on said member, and means connected to respond to one of said signals to exert on said pivoted member a rotational force which varies with time, said last named means comprising a permanent magnet having a pair of planar pole faces, a planar magnetic field responsive means positioned in the field of said pole faces and carried by said pivoted member, and signal responsive means connected to create a reactive force between said permanent magnet and said magnetic field responsive means, and motion damping means connected to said permanent magnet.

14. Apparatus for effecting a modification of a control signal comprising a pivoted member, input means positioned relative to said member to exert a first rotational force on said member, said input means being variable in accordance with the magnitude of an input signal, motion detecting means producing an output signal proportional to the motion of said pivoted member, a pivoted member balancing means connected to said motion detecting means and to said pivoted member to exert a balancing force on said member, and a pair of means, one of which is connected to respond to the output signal, positioned relative to said pivoted member to exert on said pivoted member a force which varies with time, each of said pair of means comprising a permanent magnet having a pair of planar pole faces, a planar magnetic field responsive means positioned in the field of said pole faces and carried by said switch member, and signal responsive means connected to create a reactive force between said permanent magnet and said magnetic field responsive means.

15. A signal controller comprising a permanent magnet mounted for planar movement, a pivoted member, a planar coil positioned in the magnetic field of said permanent magnet and mounted on said pivoted member, an input circuit for said coil, said input circuit when energized causing said coil to react in the field of said permanent magnet to create a rotative force on said pivoted member, motion sensing means positioned to detect the motion of said pivoted member and to produce an output signal proportional to said motion, and means connected to said motion sensing means to create a balancing force on said pivoted member in proportion to the magnitude of said output signal.

16. A signal controller comprising a permanent magnet mounted for planar movement, a pivoted member, a planar coil positioned in the magnetic field of said permanent magnet and mounted on said pivoted member, an input circuit for said coil, said input circuit when energized causing said coil to react in the field of said permanent magnet to create a rotative force on said pivoted member, and magnetic motion damping means connected to said magnet to vary with time the rotative force on said pivoted member.

17. A signal controller comprising a permanent magnet mounted for planar movement, a pivoted member, a planar coil positioned in the magnetic field of said permanent magnet and mounted on said pivoted member, an input circuit for said coil, said input circuit when energized causing said coil to react in the field of said permanent magnet to create a rotative force on said pivoted member, motion sensing means positioned to detect the motion of said pivoted member and to produce an output signal proportional to said motion, a second permanent magnet mounted for planar movement, a second planar coil positioned in the magnetic field of said second permanent magnet and connected to said pivoted member, and means connecting the output signal of said sensing means to said second planar coil, said second coil exerting a balancing force on said pivoted member.

18. A signal controller comprising a permanent magnet mounted for planar movement, a pivoted member, a planar coil positioned in the magnetic field of said permanent magnet and mounted on said pivoted member, an input circuit for said coil, said input circuit when energized causing said coil to react in the field of said permanent magnet to create a rotative force on said pivoted member, motion sensing means positioned to detect the motion of said pivoted member and to produce an output signal proportional to said motion, a second permanent magnet mounted for planar movement, a second planar coil positioned in the magnetic field of said second permanent magnet and connected to said pivoted member, and means connecting the output signal of said sensing means to said second planar coil, said second coil exerting a balancing force on said pivoted member, and a damping means connected to said second permanent magnet to produce a time variation in the balancing force on said pivoted member.

19. A signal controller comprising a permanent magnet mounted for planar movement, a pivoted member, a planar coil positioned in the magnetic field of said permanent magnet and mounted on said pivoted member, an input circuit for said coil, said input circuit when energized causing said coil to react in the field of said permanent magnet to create a rotative force on said pivoted member, motion sensing means positioned to detect the motion of said pivoted member and to produce an output signal proportional to said motion, a second permanent magnet mounted for planar movement, a second planar coil positioned in the magnetic field of said second permanent magnet and connected to said pivoted member, and means connecting the output signal of said sensing means to said second planar coil, said second coil exerting a balancing force on said pivoted member, and a pair of damping means, one of which is connected to said first named magnet and the other of which is connected to said second named magnet, each of said damping means producing a time function variation in the forces applied to said pivoted member.

20. A signal controller comprising a permanent magnet mounted for planar movement, a pivoted member, a planar coil positioned in the magnetic field of said permanent magnet and mounted on said pivoted member, an input circuit for said coil, said input circuit when energized causing said coil to react in the field of said permanent magnet to create a rotative force on said pivoted member, a second pivoted member positioned parallel to said first named pivoted member, an adjustable mechanical connection positioned between said two pivoted members to provide an adjustment of the force transfer between said pivoted members, motion sensing means positioned to detect the motion of said second pivoted member and to produce an output signal proportional to said motion, and means connected to said motion sensing means to create a balancing force on said second pivoted member in proportion to the magnitude of said output signal.

21. An apparatus for producing an output signal which bears a proportional relation to an applied signal comprising a moveable member, a first electro-magnetic means producing on said moveable member a force which varies with the magnitude of an applied signal, motion sensing means positioned to detect the motion of said moveable member and produce a proportional output signal, a second electro-magnetic means connected to said motion sensing means and producing on said moveable member a second force proportional to the output of said sensing means, and further electro-mechanical means connected to said moveable member to introduce a variable time function force on said moveable member.

22. An apparatus for producing an output signal which bears a proportional relation to an applied signal comprising a moveable member, a first electro-magnetic means producing on said moveable member a force which varies with the magnitude of an applied signal, motion sensing means positioned to detect the motion of said moveable member and produce a proportional output signal, a second electro-magnetic means connected to said motion sensing means and producing on said moveable member a second force proportional to the output of said sensing means, and a mechanical damping means connected to one of said electro-magnetic means to introduce a variable time delay function force on said moveable member.

23. An apparatus for producing an output signal which bears a proportional relation to an applied signal comprising a moveable member, a first electro-magnetic means producing on said moveable member a force which varies with the magnitude of an applied signal, motion sensing means positioned to detect the motion of said moveable member and produce a proportional output signal, a second electro-magnetic means connected to said motion sensing means and producing on said moveable member a second force proportional to the output of said sensing means, and a pair of mechanically damped electro-magnetic means connected to said moveable member to produce on said member forces variable as a function of time and as a function of the magnitude of said applied signal and said output signal.

No references cited.